W. D. PAXTON.
MOTOR-VEHICLE DRIVE.
APPLICATION FILED FEB. 18, 1918.
1,284,759.
Patented Nov. 12, 1918.
2 SHEETS—SHEET 2.
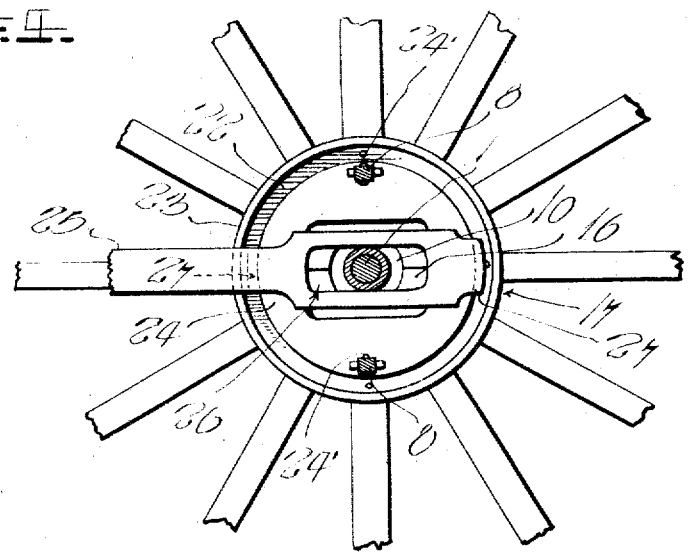
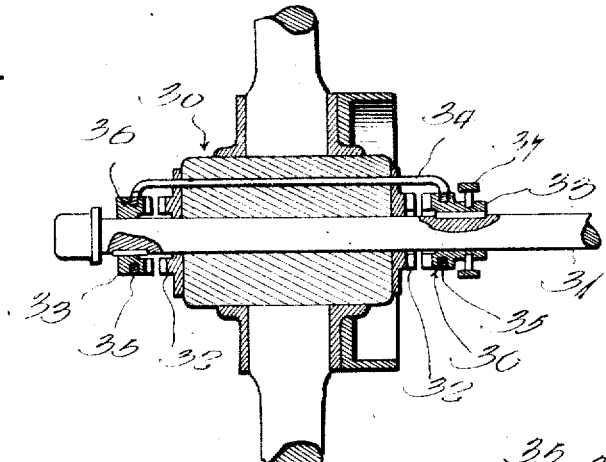
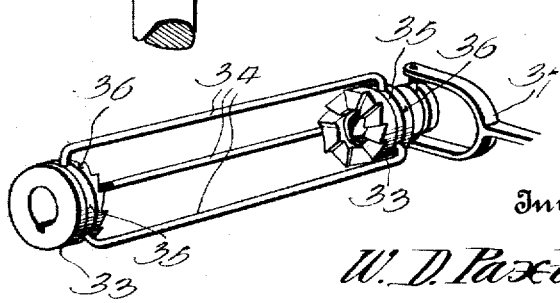
Witness
H. Woodard
Inventor
W. D. Paxton
By H. R. Wilson &co
Attorneys

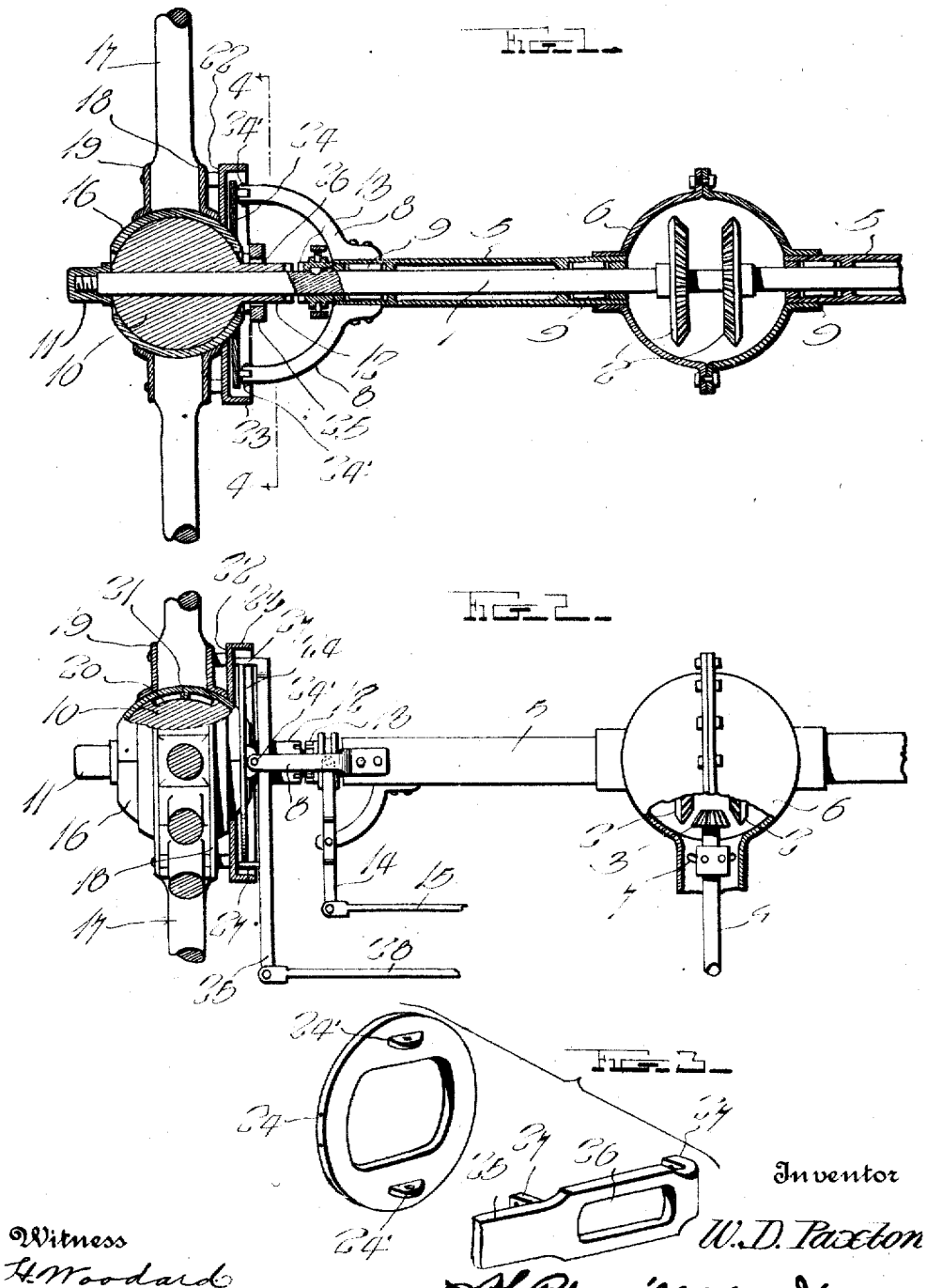

UNITED STATES PATENT OFFICE.

WILLIAM D. PAXTON, OF LAPORTE, INDIANA.

MOTOR-VEHICLE DRIVE.

1,284,759.                Specification of Letters Patent.        Patented Nov. 12, 1918.

Application filed February 18, 1918. Serial No. 217,848.

*To all whom it may concern:*

Be it known that I, WILLIAM D. PAXTON, a citizen of the United States, residing at Laporte, in the county of Laporte and State of Indiana, have invented certain new and useful Improvements in Motor-Vehicle Drives; and I do declare the following to be a full, clear, and exact description of the invention, such as will enable others skilled in the art to which it appertains to make and use the same.

One object of my invention is to improve upon the driving means of motor vehicles so that all four wheels may be driven, thus deriving more power from the machine and minimizing strain upon the transmission, motor and other parts, as well as decreasing the wear and tear upon the rear tires and reducing the danger of idle "racing" of the wheels.

A further object is to provide a novel arrangement of parts for bracing the front wheels against lateral tilting and for steering them without in any manner interrupting the drive thereof.

A still further object is to provide a unique arrangement of clutches for connecting the wheels to the axles for driving forwardly or rearwardly, and for permitting turning of said wheels independently of the axle when required.

With the foregoing general objects in view, the invention resides in the novel features of construction and unique combinations of parts to be hereinafter fully described and claimed, the descriptive matter being supplemented by the accompanying drawings which form a part of this specification and in which:

Figure 1 is a vertical section through one of the front wheels and the front axle;

Fig. 2 is a top plan view of the features shown in Fig. 1 with parts broken away and in section;

Fig. 3 is a detail perspective view of the steering arm and the ring to which it is secured;

Fig. 4 is a vertical transverse section on the plane of the line 4—4 of Fig. 1;

Fig. 5 is a sectional view through the hub of one of the rear wheels showing more particularly the manner of mounting it upon the rear axle and the arrangement of clutches for connecting and disconnecting the two; and Fig. 6 is a perspective view of the sliding clutch collars shown in Fig. 5.

In the drawings above briefly described, the numeral 1 designates the front axle of the improved machine, said axle having near its center a pair of beveled gears 2 with either one of which a pinion 3 on a longitudinal drive shaft 4 may mesh, whereby to drive the axle in either direction. A tubular casing 5 is provided for the axle 1 and is enlarged at its center to provide a housing 6 for the gearing above mentioned; and by the use of any preferred means which may well pass through the slot 7 of this housing, the shaft 4 may be shifted in one direction or the other to mesh its pinion with either gear or to locate such pinion at a neutral position. The ends of the tubular casing 5 terminate short of the ends of the axle 1 and are provided with upper and lower outwardly extending bracket arms 8 whose function will hereinafter appear. In suitable points in the casing, roller bearings or the like 9 are provided for the axle.

The projecting ends of the axle 1 extend rotatably through metal balls 10 and are provided with caps or the like 11 to prevent removal of said balls unless required. The inner portions of the balls 10 are provided with projecting clutch members 12 surrounding the axle and coöperating with sliding clutch collars 13 mounted thereon and controlled in any preferred manner as by the levers 14 and control rod 15 connected thereto. By this clutch arrangement, the balls 10 may be connected to the axle 1 for rotation therewith or may be permitted to rotate independently of said axle.

The balls 10 are received rather snugly in substantially spherical sockets 16 forming the hubs of the front wheels 17, the spokes of said wheels being preferably clamped against a fixed spoke flange 18 by means of bolts or rivets and a removable flange or ring 19, said flange 18 being by preference formed integrally with the socket 16, which latter may well be constructed in two sections to permit its passage over the ball 10. Each ball is provided in its periphery with a suitable number of grooves 20 extending longitudinally of the axle and receiving a projection 21 of the socket 16, so that the wheel and ball are forced to rotate together. Either secured upon or formed integrally with the inner end of the socket 16 is an annular flange 22 parallel with the plane of the wheel, the edge of said flange preferably having an inwardly projecting rim 23 as shown clearly in Figs. 1 and 2. A ring 24 contacts with the inner face of flange 22 and at 24' is pivoted to the ends of the arms 8, said ring serving to brace the wheel against lateral tilting and being also instrumental in steering. A steering arm 25 is provided for the ring 24 of each wheel, said arm being slotted at 26 for passage over the adjacent clutch member 12 and having lateral lugs or the like 27 secured to the front and rear edges of said ring. The rear ends of the steering arm 25 are connected by the usual steering rod 28 which may be operated by any preferred steering gear. It will thus be seen that when these arms are turned horizontally, they will correspondingly turn the rings 24 upon the pivots 24', and since these rings contact with the flanges 22 of the wheels 17, it follows that said wheels will be turned for steering the vehicle as required. When the clutch members 13 are in engagement with the members 12, the front wheels will be driven while steering, but when required for any reason, the driving connection may be broken by withdrawing said members 13 as shown for instance in Figs. 1 and 2.

The hubs 30 of the rear wheels (Fig. 5) are rotatable upon the ends of the rear axle 31 and the latter may be driven in the same manner as that above described. The ends of the hub are provided with clutch members 32 for coaction with inner and outer clutch collars 33 which are slidably keyed on the axle, said collars being connected for movement in unison by parallel rods 34 extending slidably through the hub, the ends of said rods being secured to rings 35 traveling in peripheral grooves 36 with which the collars are provided. A lever 37 or any other preferred means may be employed for shifting the inner clutch member to either an operative or inoperative position, and the movement of this member will simultaneously actuate the other. When driving forwardly, the outer collar 33 is forced into engagement with the outer clutch member 32, but for reversing the inner collar coöperates with the inner clutch member. It may also be pointed out that when both collars are disengaged as shown in Fig. 5, the rear wheels may rotate independently of the rear axle.

From the foregoing, taken in connection with the accompanying drawings, it will be obvious that the machine is of rather simple and inexpensive nature, yet that it will effectively carry out the objects of the invention, particular emphasis being laid upon the fact that all four wheels may be disengaged from their respective axles whenever required for coasting down hill or for other purposes, and that any or all of these wheels may be again operatively connected to said axles for driving purposes. Since probably the best results are obtained from the several details shown and described, they are preferably employed, but within the scope of the invention as claimed, numerous minor changes may well be made.

I claim:

1. In combination, a wheel whose hub is provided with a ball socket and with an opening at the inner end of said socket, a ball in said socket and a driving connection between said ball and socket, an integral projection on said ball passing through said opening and having clutch teeth at its free end, a driven axle passing rotatably through said ball and projection, a sliding clutch member on said axle and means for engaging it with said clutch teeth, a flat annular plate secured to the wheel around the inner end of the hub, a flat circular plate lying against said annular plate and having an opening loosely receiving said hub, lateral lugs on said circular plate, an axle casing, arms extending from said casing and pivoted to said lugs, a longitudinal steering arm having a longitudinal slot through which the projection of said ball projects loosely, and lateral lugs on said steering arm secured to the edge of said circular plate.

2. In combination, a wheel whose hub is in the form of a ball socket with central openings at the inner and outer sides of the wheel, the spokes of said wheel abutting said socket at their inner ends in line with the axis of said socket, flanges extending from said socket and retaining the spokes therebetween, a ball in said socket and a driving connection between said ball and socket, said ball having an integral projection extending through the inner opening of said socket, said projection having clutch teeth, a driven axle whose end passes through said projection and through the outer opening of said socket, a nut on the end of said axle to retain the wheel on the latter, a sliding clutch member on said axle and means for engaging it with said clutch teeth, a flat annular plate parallel with the wheel and extending from the socket at the inner side of the former, said plate having on its peripheral edge a laterally extending flange, a circular plate circumscribed by said flange and lying against said annular plate, said circular plate having a central opening loosely receiving the inner end of said socket, lateral ears on said circular plate, an axle casing, arms extending from said axle casing and pivoted to said ears, a longitudinal steering arm having a longitudinal slot through which the aforesaid projection of said ball passes, and lateral lugs on said steering arms secured to the edge of said circular plate.

In testimony whereof I have hereunto set my hand in the presence of two subscribing witnesses.

WILLIAM D. PAXTON.

Witnesses:
M. E. LELITER,
E. R. ARMSTRONG.